(12) United States Patent
Akkarakaran et al.

(10) Patent No.: US 11,812,420 B2
(45) Date of Patent: Nov. 7, 2023

(54) TECHNIQUES FOR DETERMINING BEAMS FOR BEAMFORMING WIRELESS COMMUNICATIONS

(71) Applicant: QUALCOMM Incorporated, San Diego, CA (US)

(72) Inventors: Sony Akkarakaran, Poway, CA (US); Xiao Feng Wang, San Diego, CA (US); Tao Luo, San Diego, CA (US); Wooseok Nam, San Diego, CA (US); Makesh Pravin John Wilson, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/689,603

(22) Filed: Mar. 8, 2022

(65) Prior Publication Data
US 2022/0191855 A1 Jun. 16, 2022

Related U.S. Application Data

(62) Division of application No. 16/356,805, filed on Mar. 18, 2019, now Pat. No. 11,284,396.
(Continued)

(51) Int. Cl.
*H04W 24/04* (2009.01)
*H04W 72/044* (2023.01)
(Continued)

(52) U.S. Cl.
CPC .......... *H04W 72/046* (2013.01); *H04B 7/088* (2013.01); *H04W 24/04* (2013.01); *H04W 16/28* (2013.01)

(58) Field of Classification Search
CPC .... H04B 7/088; H04W 24/04; H04W 72/541; H04L 12/28; H04L 12/50
(Continued)

(56) References Cited

U.S. PATENT DOCUMENTS 9,363,683 B2 6/2016 Raghavan et al.
9,474,013 B2 10/2016 El et al.
(Continued)

FOREIGN PATENT DOCUMENTS

WO 2015195376 12/2015
WO 2016010685 1/2016
(Continued)

OTHER PUBLICATIONS

International Search Report and Written Opinion—PCT/US2019/023012—ISA/EPO—dated Jul. 22, 2019.
(Continued)

*Primary Examiner* — Dang T Ton
(74) *Attorney, Agent, or Firm* — Sevan Savsa; ArentFox Schiff LLP

(57) ABSTRACT

Aspects described herein relate to configuring, at a device, default beam information for determining a beam for data channel communications. The device can determine to use the default beam information for configuring the beam for a data channel communication based on determining explicit beam information is not configured. In addition, the device can transmit, based on determining to use the default beam information, the data channel communication based on the beam configured using the default beam information.

30 Claims, 7 Drawing Sheets

Related U.S. Application Data

(60) Provisional application No. 62/644,904, filed on Mar. 19, 2018.

(51) Int. Cl.
*H04B 7/08* (2006.01)
*H04W 16/28* (2009.01)

(58) Field of Classification Search
USPC .......................................................... 370/329
See application file for complete search history.

(56) References Cited

U.S. PATENT DOCUMENTS

| | | |
|---|---|---|
| 9,497,002 B2 | 11/2016 | Wei |
| 10,615,921 B2 | 4/2020 | Lee et al. |
| 11,284,386 B2 | 3/2022 | Seo et al. |
| 2017/0238304 A1 | 8/2017 | Ling et al. |
| 2018/0098358 A1 | 4/2018 | Rico Alvarino et al. |
| 2019/0254042 A1 | 8/2019 | Cirik et al. |
| 2019/0274098 A1 | 9/2019 | Cheng et al. |
| 2019/0289588 A1 | 9/2019 | Akkarakaran et al. |
| 2020/0313746 A1 | 10/2020 | Bai et al. |
| 2020/0383167 A1 | 12/2020 | Sengupta et al. |
| 2022/0201675 A1 | 6/2022 | Akkarakaran et al. |
| 2022/0303093 A1* | 9/2022 | Abebe ................. H04W 52/325 |

FOREIGN PATENT DOCUMENTS

| | | |
|---|---|---|
| WO | 2017083489 A1 | 5/2017 |
| WO | 2018017977 A1 | 1/2018 |

OTHER PUBLICATIONS

Partial International Search Report—PCT/US2019/023012—ISA/EPO—dated May 27, 2019.

QUALCOMM Incorporated: "Remaining Details on QCL", 3GPP TSG RAN WG1 Meeting #92, 3GPP Draft; R1-1802832 Remaining Details on QCL, 3rd Generation Partnership Project (3GPP), Mobile Competence Centre, 650, Route Des Lucioles ; F-06921 Sophia-Antipolis Cedex, France, vol. RAN WG1, No. Athens, Greece; Feb. 26, 2018-Mar. 2, 2018, Feb. 17, 2018 (Feb. 17, 2018), pp. 1-12, XP051398245, Retrieved from the Internet: URL: http://www.3gpp.org/ftp/tsg_ran/WG1_RL1/TSGR1_92/Docs/ [retrieved on Feb. 17, 2018].

CATT: "Remaining Issues on DL Beam Recovery", 3GPP TSG RAN WG1 Meeting AH 1801, R1-1800242, 3RD Generation Partnership Project (3GPP), Mobile Competence Centre, 650, Route Des Lucioles, F-06921, Sophia-Antipolis Cedex, France, vol. RAN WG1, No. Vancouver, Canada, Jan. 22, 2018-Jan. 26, 2018, Jan. 13, 2018, 5 Pages, XP051384721, The Whole Document.

Huawei., et al., "Beam Failure Recovery for SCell", 3GPP TSG-RAN WG2 #101, R2-1801814, 3RD Generation Partnership Project (3GPP), Mobile Competence Centre, 650, Route Des Lucioles, F-06921, Sophia-Antipolis Cedex, France, vol. RAN WG2, No. Athens, Greece, Feb. 26, 2018-Mar. 2, 2018, Feb. 16, 2018, 2 Pages, XP051400050, The Whole Document.

Huawei et al., "Non-Contention Based Random Access for Beam Failure Recovery in CA", R2-1801049, 3GPP TSG-RAN WG2#AH-1801, 3RD Generation Partnership Project (3GPP), Mobile Competence Centre, 650, Route Des Lucioles, F-06921, Sophia-Antipolis Cedex, France, Vancouver, Canada, Jan. 22-26, 2018, Jan. 26, 2018, 3 Pages, The Whole Document.

\* cited by examiner

TECHNIQUES FOR DETERMINING BEAMS FOR BEAMFORMING WIRELESS COMMUNICATIONS

CLAIM OF PRIORITY UNDER 35 U.S.C. § 119

The present Application for Patent is a Divisional of application Ser. No. 16/356,805, entitled "TECHNIQUES FOR DETERMINING BEAMS FOR BEAMFORMING WIRELESS COMMUNICATIONS" filed Mar. 18, 2019, which claims priority to Provisional Application No. 62/644,904, entitled "TECHNIQUES FOR DETERMINING BEAMS FOR BEAMFORMING WIRELESS COMMUNICATIONS" filed Mar. 19, 2018, which are assigned to the assignee hereof and hereby expressly incorporated by reference herein for all purposes.

BACKGROUND

Aspects of the present disclosure relate generally to wireless communication systems, and more particularly, to determining beams for beamforming signals in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In wireless communications technologies, such as 5G, LTE, etc., physical uplink shared channel (PUSCH) beams for beamforming PUSCH transmissions can be determined based on sounding reference signal (SRS) resource indicator (SRI) previously transmitted from a device. Sometimes the SRI is not present (e.g., in the case of fallback downlink control information (DCI) having no SRI, before receiving a sounding reference signal (SRS) configuration, etc.), in which case determining the PUSCH beam (e.g., based on SRI) may be undefined.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided including configuring, at a user equipment (UE), default beam information for a beam for data channel communications, using the default beam information for configuring the beam for a data channel communication where explicit beam information is not configured or indicated for a data channel communication, and transmitting the data channel communication based on the beam configured using the default beam information.

In another example, an apparatus for wireless communication is provided including a transceiver, a memory configured to store instructions, and one or more processors communicatively coupled with the transceiver and the memory. The one or more processors are configured to configure default beam information for a beam for data channel communications, use the default beam information for configuring the beam for a data channel communication where explicit beam information is not configured or indicated for a data channel communication, and transmit the data channel communication based on the beam configured using the default beam information.

In another example, an apparatus for wireless communication is provided including means for configuring default beam information for a beam for data channel communications, means for using the default beam information for configuring the beam for a data channel communication where explicit beam information is not configured or indicated for a data channel communication, and means for transmitting the data channel communication based on the beam configured using the default beam information.

In another example, a computer-readable medium is provided including code executable by one or more processors for wireless communication. The code includes code for configuring default beam information for a beam for data channel communications, using the default beam information for configuring the beam for a data channel communication where explicit beam information is not configured or indicated for a data channel communication, and transmitting the data channel communication based on the beam configured using the default beam information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
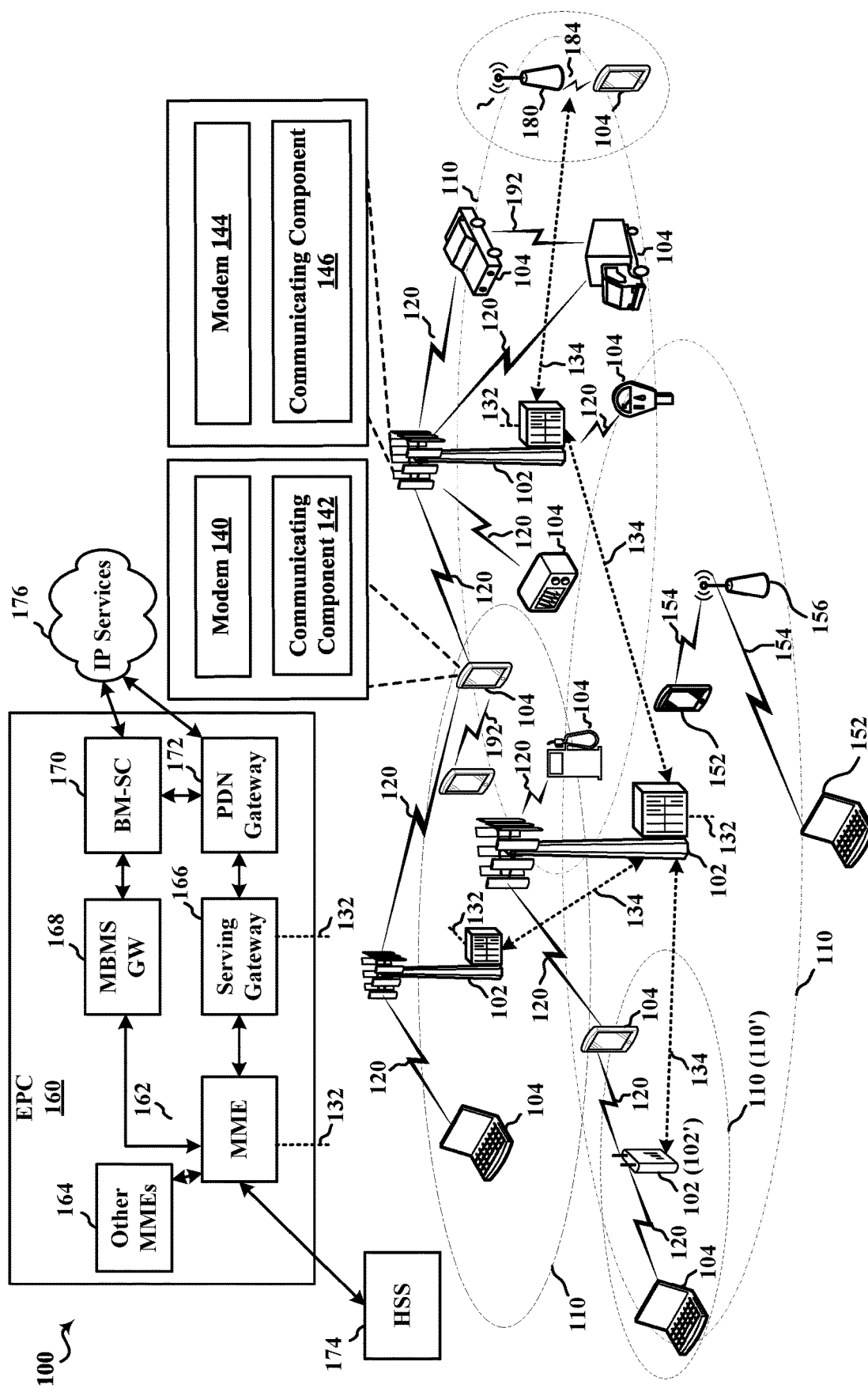
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring default beam information to be used by a device for determining a beam for data channel communications, where other beam information may not be available. For example, the device may typically use a sounding reference signal (SRS) resource indicator (SRI) to determine a beam for data channel communications, but the SRI may not always be defined. In this example, the device may use the default beam configuration for determining the beam to use in transmitting the data channel communications. In an example, the device may configure the default beam information semistatically as a virtual control channel resource from which the beam may be derived (e.g., without actually transmitting control data over the virtual control channel resources). In another example, the device may configure the default beam information as another beam, such as an actual control channel resource, another signal, etc., which may be based on a configuration received from a network.

Moreover, in an example, the device can determine the default beam information for a given component carrier (CC) based on a beam used for different CC. In one example, the different CC may be in the same group as the CC, and may be configured as a reference CC for determining beams for each of the CCs in the group. In another example, the different CC can be part of a different group of CCs than the CC. Moreover, in an example, the different CC can be determined as the reference CC based on determining that the different CC transmits a control channel for the group of CCs; for example, the group of can be is a physical uplink control channel (PUCCH) group and the different CC can be the CC carrying the PUCCH. In addition, for example, the beam for the CC can be determined based on one or more signals transmitted over the different CC, such as SRS, a control channel signal, etc., and/or may exclude some control signals, such as beam sweeping transmissions, access channel transmissions, beam failure recovery request (BFRQ), etc. In yet another example, the beam for the CC can be determined based on a virtual control channel resource defined for the different CC. Thus, in any case, the device can determine the default beam information for generating the beam for transmitting data channel communications though other explicit beam information may be absent or undefined.

In another example, the device can also determine a BFRQ resource for a CC for transmitting a BFRQ signal over the CC to reestablish a beam link. For example, the BFRQ resource may be determined based on a BFRQ resource used by a different CC. In an example, the BFRQ resource can be selected based on identifying a CC in a group of CCs on which the beam failed. In another example, the BFRQ resource can additionally or alternatively be selected to indicate a BFRQ for another group of CCs on which the beam failed. In another example, a control channel over the different CC can be used to transmit the BFRQ resource for the CC, and/or can include transmitting an index or other indicator of the CC or a corresponding group of CCs. In any case, for example (e.g., based on transmitting the BFRQ), the device can monitor the CC, the different CC (e.g., the control channel thereof), or a plurality of CCs indicated by the resources used for the BFRQ such as to detect a beam and reestablish the beam link. Thus, the device can transmit BFRQ in such a way to indicate information regarding beam failure and/or by using resources of other CCs to facilitate reestablishing the beam link on a CC on which the beam failed.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects described herein, an example wireless communication access network 100 includes at least one UE 104 with a modem 140 for communicating in a wireless network and a communicating component 142 for determining default beam information and/or transmitting BFRQ signals, as described further herein. Further, wireless communication access network 100, also referred to as a wireless wide area network (WWAN), includes at least one base station 102 via which the UE 104 can communicate with one or more nodes of the wireless communication access network to communicate data corresponding to the service. The base station 102 can also have a modem 144 for communicating in the wireless network and a communicating component 146 for receiving beams and/or BFRQ signals, as described further herein. In this regard, for example, communicating component 142 can determine default beam information for generating beams for data channel communications to the base station 102. In another example, communicating component 142 can use parameters or properties of a CC or related communication to indicate information regarding a BFRQ, which communicating component 146 can receive and determine parameters for transmitting a recovery beam to the UE 104.

The one or more UEs 104 and/or the one or more base stations 102 may communicate with other UEs and/or other base stations via an Evolved Packet Core (EPC) 160. The base stations 102 (which can be collectively referred to as Evolved Universal Mobile Telecommunications System (UMTS) Terrestrial Radio Access Network (E-UTRAN)) may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 156 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
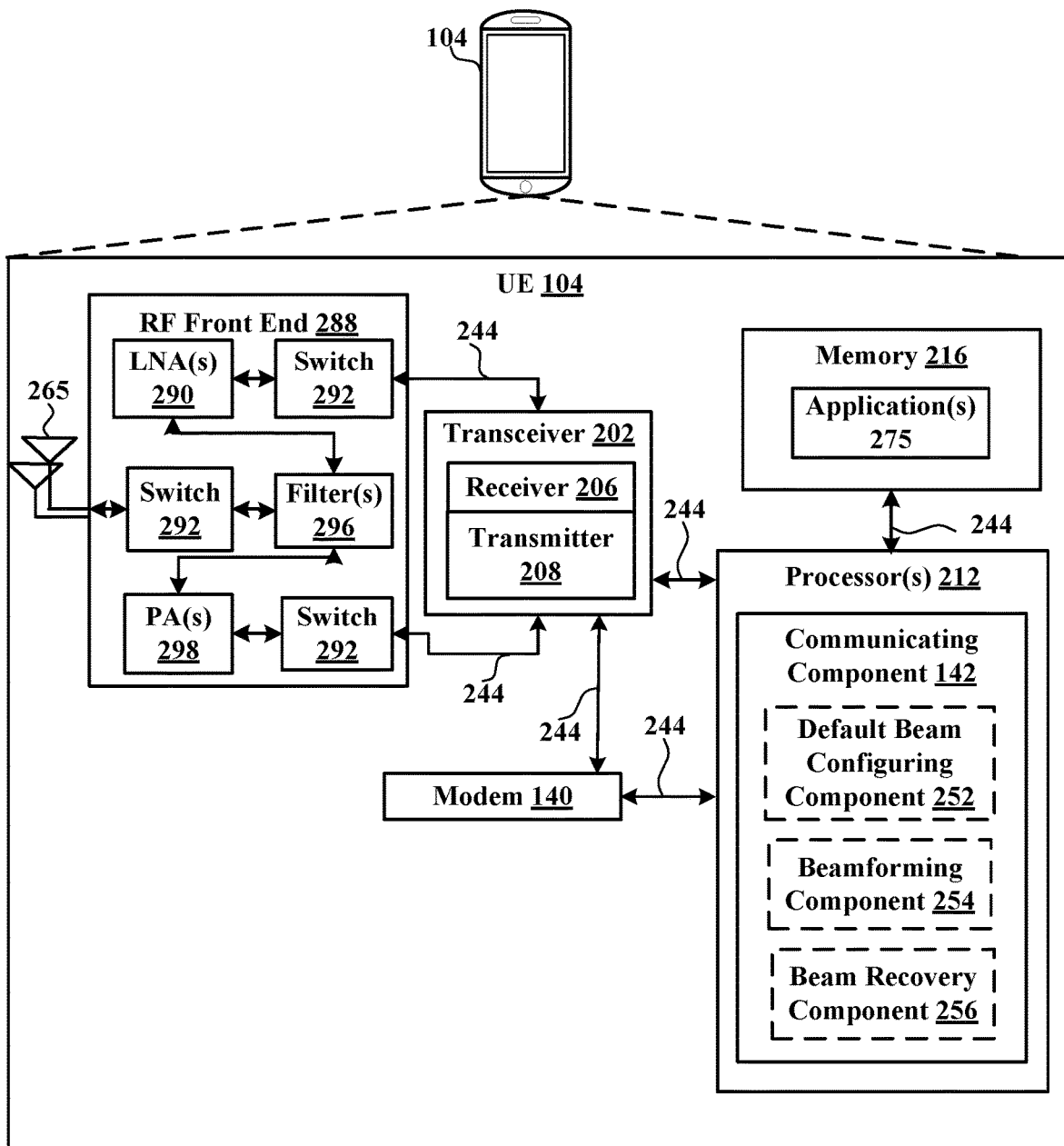
FIG. 2 is a block diagram illustrating an example of a UE, in accordance with various aspects of the present disclosure.
Figure 3:
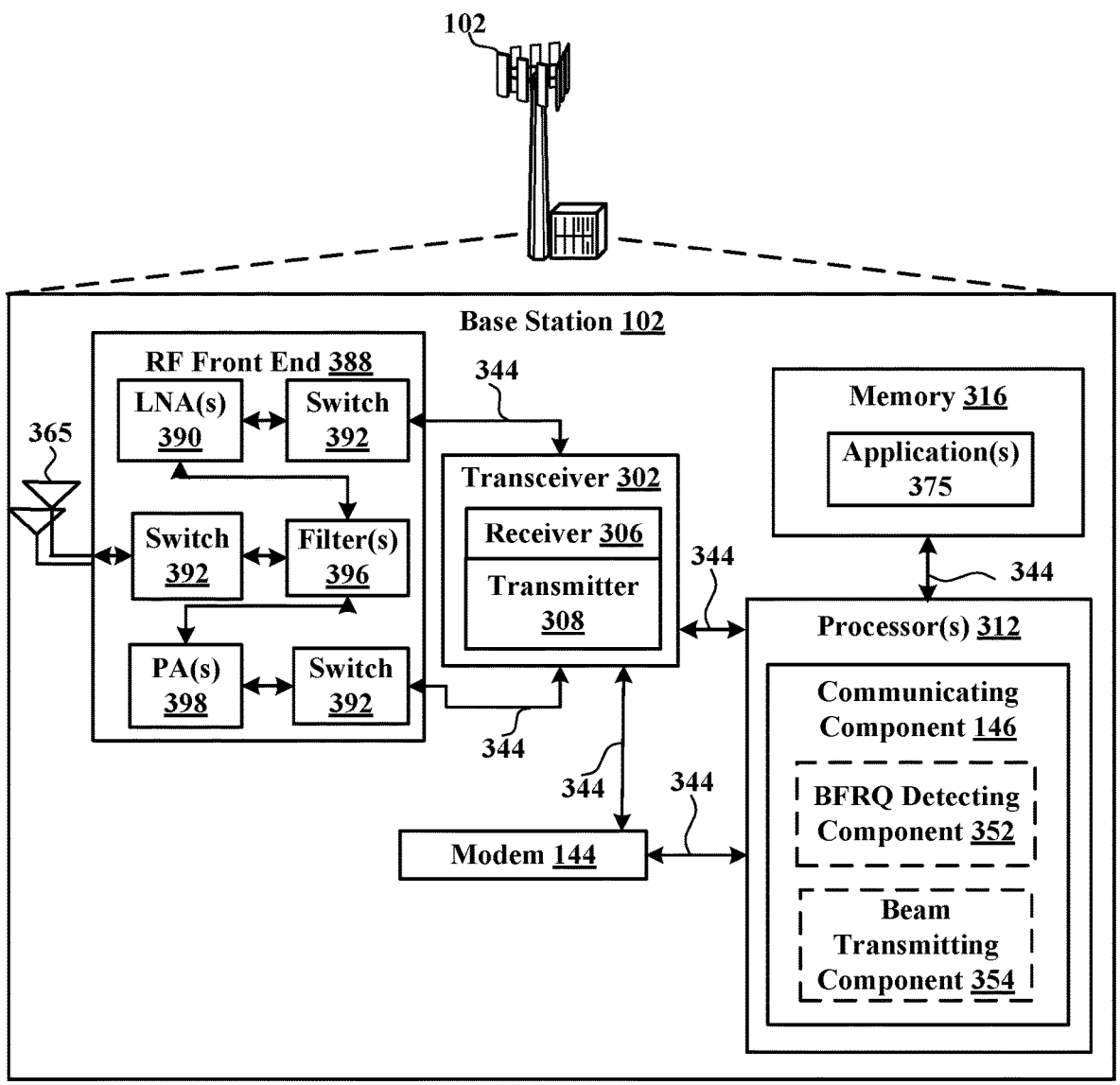
FIG. 3 is a block diagram illustrating an example of a base station, in accordance with various aspects of the present disclosure.
Figure 4:
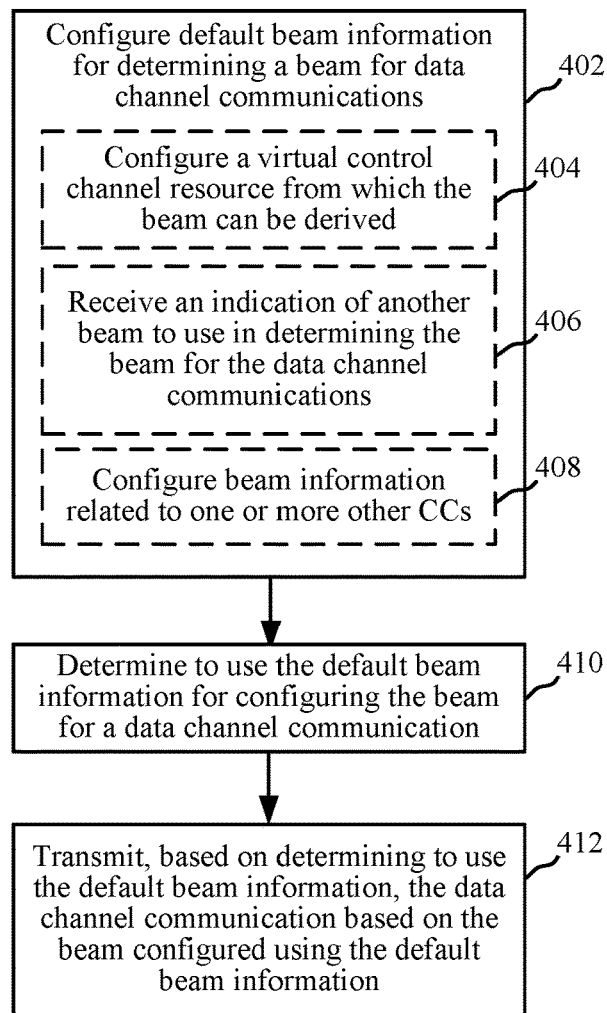
FIG. 4 is a flow chart illustrating an example of a method for configuring default beam information, in accordance with various aspects of the present disclosure.
Figure 5:
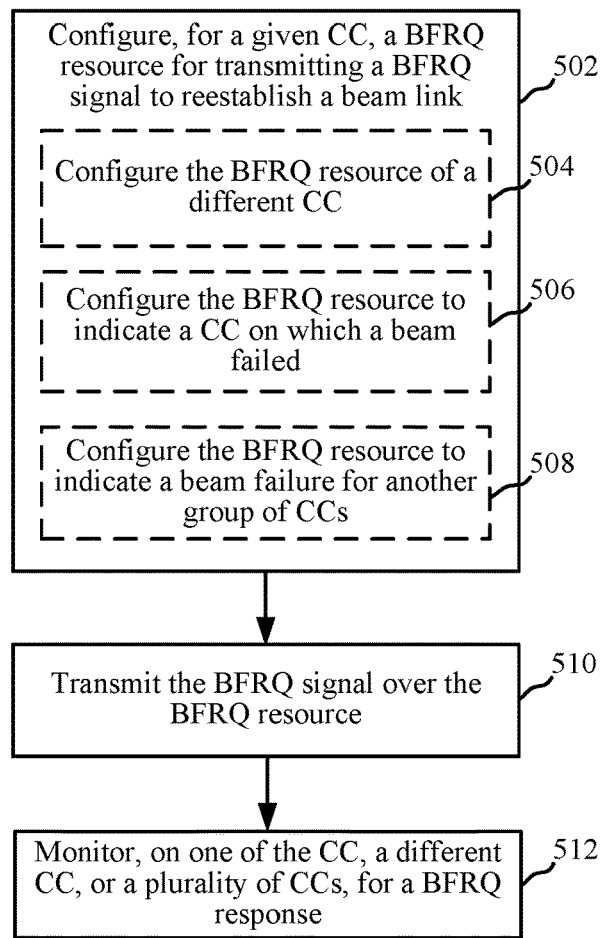
FIG. 5 is a flow chart illustrating an example of a method for transmitting beam failure recovery request (BFRQ) signals, in accordance with various aspects of the present disclosure.
Figure 6:
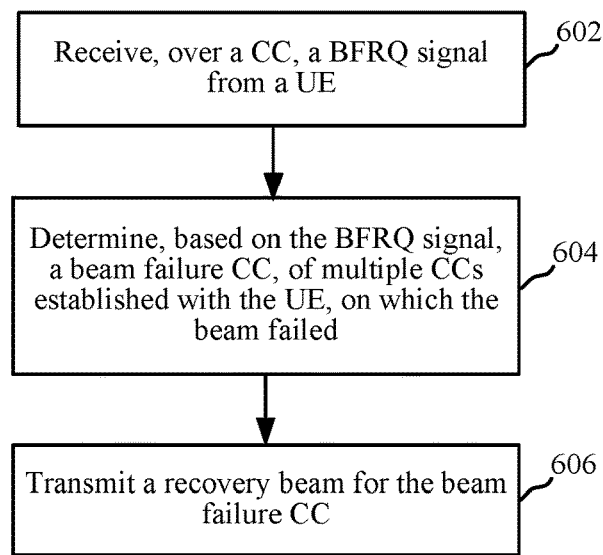
FIG. 6 is a flow chart illustrating an example of a method for transmitting recovery beams, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or communicating component 142 to enable one or more of the functions described herein related to determining default beam information for transmitting data channel communications and/or for transmitting BFRQ signals, as described further herein. Further, the one or more processors 212, modem 140, memory 216, transceiver 202, RF front end 288 and one or more antennas 286, may be configured to support voice and/or data calls (simultaneously or non-simultaneously) in one or more radio access technologies.

In an aspect, the one or more processors 212 can include a modem 140 and/or can be part of the modem 140 that uses one or more modem processors. Thus, the various functions related to communicating component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with communicating component 142 may be performed by transceiver 202.

Also, memory 216 may be configured to store data used herein and/or local versions of applications 275 or communicating component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 142 and/or one or more of its subcomponents, and/or data associated therewith, when UE 104 is operating at least one processor 212 to execute communicating component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 142 can optionally include a default beam configuring component 252 for configuring default beam information that can be used to generate a beam for data channel communications in absence of other explicit beam information (e.g., in absence of a scheduling request indicator (SRI), a recent actual physical uplink control channel (PUCCH), etc.), and/or a beamforming component 254 for beamforming data channel communication signals based at least in part on the default beam information (or other determined beam information). Communicating component 142 can also optionally include a beam recovery component 256 for transmitting a BFRQ signal over resources of a CC to indicate beam failure and/or recovery information to a base station 102 to be used in transmitting a recovery beam.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 may include a variety of components, some of which have already been described above, but including components such as one or more processors 312 and memory 316 and transceiver 302 in communication via one or more buses 344, which may operate in conjunction with modem 144 and communicating component 146 to enable one or more of the functions described herein related to receiving beams and/or BFRQ signals and transmitting corresponding recovery beams.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, communicating component 146 can optionally include a BFRQ detecting component 352 for detecting BFRQ signals and/or related parameters based on receiving a BFRQ signal from a UE 104, and/or a beam transmitting component 354 for transmitting a recovery beam to the UE 104 based on the one or more parameters related to the BFRQ signals.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for configuring default beam information for generating beams for data channel communications. In an example, a UE 104 can perform the functions described in method 400 using one or more of the components described in FIGS. 1-2.

In method 400, at Block 402, default beam information can be configured for determining a beam for data channel communications. In an aspect, default beam configuring component 252, e.g., in conjunction with processor(s) 212, memory 216, transceiver 202, communicating component 142, etc., can configure the default beam information for determining the beam for data channel communications. For example, the default beam configuring component 252 can configure the default beam information to be used for generating beams when other explicit beam information is unavailable. Beam information may include, for example, resources over which to transmit the beam, directional information to achieve a beam direction when transmitting the beam (such a quasi-co-location (QCL) indication, a beamforming matrix, or indication of power to transmit from each of multiple antennas to achieve the direction), and/or the like. For example, beamforming component 254 can typically generate beams based on SRI, but there may be instances where SRI is undefined, such as where a fallback DCI (which is called DCI format 0_0 in NR specification) is received, which may not include SRI, and/or prior to reception of SRS configuration from a base station 102. In another example, it may be possible to use a beam of a recent actual PUCCH resource as the beam for transmitting the data channel communications. The actual PUCCH resource, however, may be infrequent (e.g., and can become stale for the current communication environment), such as when the semistatic PUCCH configuration is of insufficient frequency and may have occurred at some time in the past (e.g., many slots ago and may not be optimal to represent the current communication environment). In another example, the PUCCH may be absent (e.g., for a CC in a PUCCH group that does not carry PUCCH). Beamforming component 254 can utilize a beam generated from default beam information in such cases, for example, for data channel communications.

In an example, configuring the default beam information at Block 402 may optionally include, at Block 404, configuring a virtual control channel resource from which the beam can be derived. In an aspect, default beam configuring component 252, e.g., in conjunction with processor(s) 212, memory 216, transceiver 202, communicating component 142, etc., can configure the virtual control channel resource from which the beam can be derived. For example, default beam configuring component 252 can semistatically configure the default beam information as a virtual PUCCH resource, which can be considered as virtual based on control data not being transmitted over the resource. In an example, default beam configuring component 252 can reuse configuration procedures and/or attributes associated with actual PUCCH resources, including spatial information (e.g., transmit beam), in generating the virtual PUCCH resource as the default beam information.

For example, the default beam configuring component 252 can periodically or semi-persistently generate the virtual PUCCH resource, where a periodicity or other timing/event-related information for causing generation of the virtual PUCCH may be configured (e.g., by the base station 102 and/or similarly to a SR or persistent/semi-persistent channel state information (CSI) report). In addition, in an example, communicating component 142 can exclude the virtual PUCCH resource from (e.g., all) control channel (e.g., PUCCH) resource sets (e.g., to ensure that no transmission occurs on this channel). In this example, ACK/NACK resource indicator (ARI) or other PUCCH indexing does not point to the virtual PUCCH resources as they are not used for transmission. In another example, communicating component 142 can include the virtual PUCCH resource from PUCCH resource sets, but can disable or disallow indexing such as ARI, or can enable indexing for special situations/purposes, such as updating the virtual resource beam.

Moreover, in an example, default beam configuring component 252 can determine the virtual PUCCH resource when determining a most recent PUCCH resource (e.g., virtual or actual) for determining the default beam for the data channel communications. In this regard, for example, the PUCCH duration may be relevant for virtual PUCCH resource where default beam configuring component 252 determines the most recent PUCCH resource based on a last symbol (e.g., OFDM symbol). In addition, for example, other attributes of the virtual PUCCH resource, such as assigned resource blocks, may not be necessary and may not be included in (or may otherwise be deleted from) the configuration. In yet another example, the attribute(s) may be set to zero or other unused values (e.g., number of resource blocks=0), which can indicate that the PUCCH resource is virtual in this regard.

In another example, configuring the default beam information at Block 402 may optionally include, at Block 406, receiving an indication of another beam to use in determining the beam for the data channel communications. In an aspect, default beam configuring component 252, e.g., in conjunction with processor(s) 212, memory 216, transceiver 202, communicating component 142, etc., can receive the indication of another beam to use in determining the beam for the data channel communications. For example, default beam configuring component 252 can receive the indication to use another beam from the base station 102. The base station 102 may signal the indication, for example, using radio resource control (RRC) layer signaling, a media access control (MAC) control element (CE), downlink control information (DCI), etc., and may signal the indication periodically or semi-persistently to update the beam to be used as the default beam. In one example, default beam configuring component 252 can receive an indication to use the same beam configuration as is used for a specific PUCCH resource (e.g., a resource for an SR or periodic CSI, or a PUCCH resource with a lowest index among the configured PUCCH resources), and default beam configuring component 252 can accordingly set the default beam information based on the indicated beam (e.g., specific PUCCH resource) and/or an indicated beam configuration configured by the base station 102.

Moreover, as described, the default beam configuring component 252 can determine whether to configure the default beam information as the virtual PUCCH resource or using another beam based on one or more parameters. For example, the one or more parameters may relate to a time associated with the virtual PUCCH and the other beam such that the default beam configuring component 252 can use the most recent as the default beam information and/or use one or the other where a time difference achieves a threshold, etc. In an example, the time can be associated and measured as a real time, a number of slots or symbols, etc.

In yet another example, configuring the default beam information at Block 402 may optionally include, at Block 408, configuring beam information related to one or more other CCs. In an aspect, default beam configuring component 252, e.g., in conjunction with processor(s) 212, memory 216, transceiver 202, communicating component 142, etc., can configure the beam information related to one or more other CCs. For example, the beam for the data channel communications can correspond to a CC on the UE 104 that is established with the base station 102, and the default beam information for the CC can be determined based on information (e.g., beam or otherwise) related to one or more other CCs (e.g., in the same group as the CC or not). Thus, in one example, default beam configuring component 252 can determine default beam information for the CC, though PUCCH may be absent in the CC, by leveraging information from the other CCs. In other examples, however, PUCCH may be used in the CC, but the default beam information for the CC can still be determined based on the one or more other CCs.

For example, each CC may have a subset of actual PUCCH resources, virtual PUCCH resources, other default beam information, etc., as described above, for determining a beam for data channel communications. For determining a beam for data channel communications on each CC, the default beam information can be based on a specific (actual or virtual) PUCCH resource, other default beam information, etc. defined for a specific reference CC, where information regarding which CC is the reference CC can be configured at the UE 104 (e.g., by base station 102 or otherwise). In one example, the CCs can be divided into groups, and a reference CC can be assigned for each group such that for each CC in the group, default beam information for each CC can be determined based on beam information of the reference CC. Moreover, default beam configuring component 252 can divide the CC into groups separately within a defined PUCCH group of CCs. Moreover, in an example, for a CC group having a single CC that carries PUCCH, this CC that carries PUCCH can be used as the reference CC for determining default beam information for the other CCs in the group. In addition, for example, default beam configuring component 252 can determine to exclude certain PUCCH resources in determining the default beam information, such as beam-sweeping transmissions.

In method 400, at Block 410, it can be determined to use the default beam information for configuring the beam for a data channel communication. In an aspect, beamforming component 254, e.g., in conjunction with processor(s) 212, memory 216, transceiver 202, communicating component 142, etc., can determine to use the default beam information for configuring the bean for the data channel communication. In an example, beamforming component 254 can determine to use the default beam information based at least in part on determining that other beam information is not configured or indicated (e.g., the other beam information is unavailable, absent, etc.). For example, this may include determining a SRI as unavailable, a PUCCH resource as unavailable or expired (e.g., determined as having an associated time that achieves a threshold from a current time), or not yet configured, etc. In this regard, beamforming component 254 can generate the beam for the data channel communications using the default beam information, which may include or be based on a virtual PUCCH resource or other configured beam, beam information from another CC, etc., as described.

In method 400, at Block 412, the data channel communication, based on the beam configured using the default beam information, can be transmitted based on determining to use the default beam information. In an aspect, communicating component 142, e.g., in conjunction with processor(s) 212, memory 216, transceiver 202, etc., can transmit, based on determining to use the default beam information, the data channel communication based on the beam configured using the default beam information. For example, communicating component 142 can transmit the beamformed data channel communication by adjusting communication properties of multiple antennas of the UE 104 to achieve a directional beam generated by the beamforming component 254.

FIG. 5 illustrates a flow chart an example of a method 500 for transmitting BFRQ signals to a base station to indicate beam failure and/or request transmission of a recovery beam. In an example, a UE 104 can perform the functions described in method 500 using one or more of the components described in FIGS. 1-2.

In method 500, at Block 502, a BFRQ resource for transmitting a BFRQ signal to reestablish a beam link can be configured for a given CC. In an aspect, beam recovery component 256, e.g., in conjunction with processor(s) 212, memory 216, transceiver 202, communicating component 142, etc., can configure, for the given CC, the BFRQ resource for transmitting the BFRQ signal to reestablish the beam link. For example, beam recovery component 256 can configure the BFRQ resource based on a configuration of a different CC (e.g., the BFRQ resource used by the given CC can be on resources used by the different CC). In an example, a BFRQ signal can typically be transmitted on a resource selected from a set of configured beam-swept resources where the selected resource can help identify strong beams to reestablish a beam link. The BFRQ signal may be used if all links between the UE 104 and base station 102 fail or only a subset of links fail, and the selected resource may identify a subset of the failed or not-yet failed links. In carrier aggregation, however, BFRQ resources may not be configured for each CC. Thus, a given CC may use the resources of the different CC (e.g., which may not have a failed link) to send the BFRQ signal. Note that the BFRQ is transmitted on the uplink, to indicate failure of a downlink beam. In cases when the number of CCs is different on the uplink and the downlink, or for example, when there is a single uplink but both a primary (or normal) and a supplemental downlink, it may be that the uplink CC on which BFRQ is sent does not necessarily correspond to a downlink CC for which the beam failure is indicated by the BFRQ. As described above, even in the symmetric situation where every downlink CC is paired with a corresponding uplink CC, such asymmetry may be introduced because BFRQ resources may not be configured in every uplink CC.

In one example, in configuring the BFRQ resource at Block 502, optionally at Block 504, the BFRQ resource of a different CC can be configured. In an aspect, beam recovery component 256, e.g., in conjunction with processor(s) 212, memory 216, transceiver 202, communicating component 142, etc., can configure the BFRQ resource of the different CC. In this example, beam recovery component 256 can use the BFRQ resource configured for the different CC as the BFRQ resource for the given CC (e.g., to transmit BFRQ for the given CC). In an example, the CCs can be grouped, and the different CC can be configured as a reference CC for the CCs in the group for determining BFRQ resources for each of the CCs in the group. In one example, beam recovery component 256 can determine the reference CC as the different CC over which to configure the BFRQ resource based on determining that the different CC is used to transmit PUCCH for the group of CCs.

In addition, in this example, beam recovery component 256 can indicate for which CC the beam failure is being reported, which can be an explicit or implicit identification. In one example, beam recovery component 256 can use other resources of the different CC, such as control channel (e.g., PUCCH) resources to indicate beam failure for the given CC. For example, a current beam failure recovery procedure can allocate beam-swept resources, which can be used if all beams fail. Where a separate set of CCs can use a separate set of beams that have not failed, however, regular PUCCH transmissions in one of the CCs whose beams have not failed can directly convey the beam failure recovery information for the given CC and/or other CCs for which BFRQ is to be indicated. In this example, beam recovery component 256 can use the PUCCH resources of the different CC (or set of CCs) whose beams have not failed to transmit beam failure recovery information (e.g., a BFRQ signal and/or related parameters) to the base station 102. In an example, beam recovery component 256 can configure a subset of PUCCH resources on one or more sets of CCs for this purpose. In addition, the beam failure recovery information conveyed can include a CC index or CC group index (or other indication of a CC or group of CCs) experiencing beam failure, beam strengths to be used by the base station 102 for selecting a recovery beam, etc. In addition, in an example, beam recovery component 256 may convey the information in sequential fashion (e.g., partial info conveyed in configured opportunities), such that the base station 102 can then schedule PUSCH and remaining info conveyed in a MAC-CE in those PUSCH, or the base station 102 can get remaining info by requesting an aperiodic cross-carrier CSI report, etc.

In addition, for example, in configuring the BFRQ resource at Block 502, optionally at Block 506, the BFRQ resource can be configured to indicate a CC on which a beam failed. In an aspect, beam recovery component 256, e.g., in conjunction with processor(s) 212, memory 216, transceiver 202, communicating component 142, etc., can configure the BFRQ resource to indicate the CC on which the beam failed. For example, beam recovery component 256, in this regard, can use an explicit indication of the CC (e.g., by specifying an index or other identifying information) or an implicit indication of the CC. For example, beam recovery component 256 can use the BFRQ resource selection to indicate the CC on which the beam failed (e.g., an index of the BFRQ resource block, symbol, slot, etc., can be indicative of an index of a CC on which the beam failed). In one example, this may be implicit in that beam recovery component 256 can use the BFRQ resource assigned to the CC over which the beam failed to transmit the BFRQ signal (and/or can transmit BFRQ signals over BFRQ resources assigned to all CCs on which a beam failed).

In another example, in configuring the BFRQ resource at Block 502, optionally at Block 508, the BFRQ resource can be configured to indicate a beam failure for another group of CCs. In an aspect, beam recovery component 256, e.g., in conjunction with processor(s) 212, memory 216, transceiver 202, communicating component 142, etc., can configure the BFRQ resource to indicate a beam failure for another group of CCs. For example, beam recovery component 256 can use implicit or explicit indication(s) of the CCs or groups of CCs for which beam failure is indicated. For example, beam recovery component 256 can use different resources to indicate beam failure on different CCs and/or subsets of CCs, as described, such as by using certain resource blocks, tones, symbols, slots, or other divisions of time and/or frequency. In one example, a BFRQ resource on one CC group can identify beam failure on another CC group, as the one CC group may have poor signal quality for BFRQ reception.

In method 500, at Block 510, the UE can transmit the BFRQ signal over the BFRQ resource. In an aspect, communicating component 142, e.g., in conjunction with processor(s) 212, memory 216, transceiver 202, etc., can transmit the BFRQ signal over the BFRQ resource. For example, communicating component 142 can transmit the BFRQ signal, which may indicate various information such as an index of the CC or a group of CCs having beam failure, one or more beam strength parameters, etc., over the BFRQ resource, which may be on the different CC. In this regard, as described further herein, the base station 105 can receive the BFRQ signal and accordingly transmit a recovery beam and/or related information to reestablish a beam link over the CC. Moreover, as described, communicating component 142 can transmit the BFRQ signal over PUCCH resources of the different CC.

In method 500, at Block 512, one of the CC, a different CC, or a plurality of CCs, can be monitored for a BFRQ response. In an aspect, communicating component 142, e.g., in conjunction with processor(s) 212, memory 216, transceiver 202, etc., can monitor, on one of the CC, a different CC, or a plurality of CCs, for a BFRQ response. For example, communicating component 142 can monitor the CC on which the beam failed, the different CC (e.g., on which the BFRQ signal is transmitted, or otherwise determined as not having beam failure), a plurality of CCs on which beams failed, a plurality of CCs in a group including the CC, a combination thereof, etc. for the BFRQ response. In one example, determining the CC to monitor may depend on how the BFRQ signal was transmitted, as described above. In one example, if BFRQ on one CC or CC group indicates beam failure on another CC-group, then communicating component 142 can monitor within the CC-group carrying BFRQ. If BFRQ on the one CC or CC group indicates beam failure on a subset of CCs in another CC group, communicating component 142 can monitor within the CCs of that group that did not experience beam failure. In addition, for example, the UE 104 can be configured with the rules for monitoring when configuring BFRQ resources and/or beam failure recovery control resource sets (CORESETs). A CORESET can include a partition of PDCCH resources, where each CORESET can have its own parameters, such as beam direction and monitoring periodicity. A UE may be configured to monitor one or more CORESETs. The BFR CORESET can be beam-swept (i.e., different time-instances of this CORESET can correspond to different synchronization signal (SS)-block beams).

In another example, where the communicating component 142 transmits the BFRQ signal over the PUCCH resources of the different CC, the communicating component 142 may receive control signaling on the downlink of the different CC (e.g., via MAC-CE, DCI, etc.) to complete the beam failure recovery process. In another example, communicating component 142 can monitor a beam failure recovery CORESET beam (or beams) to reestablish the link based on signal strengths indicated as part of the direct beam failure recovery indication on the different CC.

FIG. 6 illustrates a flow chart an example of a method 600 for receiving BFRQ signals and transmitting corresponding recovery beams. In an example, a base station 102 can perform the functions described in method 600 using one or more of the components described in FIGS. 1 and 3.

In method 600, at Block 602, a BFRQ signal can be received from a UE over a CC. In an aspect, BFRQ detecting component 352, e.g., in conjunction with processor(s) 312, memory 316, transceiver 302, communicating component 146, etc., can receive, over the CC, the BFRQ signal from the UE. For example, communicating component 146 can receive the BFRQ signal, which may explicitly or implicitly indicate one or more CCs over which beam failure has occurred. For example, the BFRQ signal may include an index or other identifier of one or more CCs over which beam failure has occurred, which may be used to determine the CC(s) over which beam failure has occurred. The BFRQ signal may additionally or alternatively include an indication of one or more beam strengths of other beams, which can be used in selecting a recovery beam, etc. In addition, as described, a resource over which the BFRQ signal is received can implicitly indicate one or more parameters regarding a CC or CCs over which beams have failed. For example, the resource may indicate an index of the CC or group of CCs, as described. Moreover, and in this regard for example, the BFRQ signal can be received on BFRQ resources of a CC other than the CC(s) over which the beam failed and/or other resources (e.g., PUCCH resources) of the CC.

In method 600, at Block 604, a beam failure CC, of multiple CCs established with the UE, on which the beam failed can be determined based on the BFRQ signal. In an aspect, BFRQ detecting component 352, e.g., in conjunction with processor(s) 312, memory 316, transceiver 302, communicating component 146, etc., can determine, based on the BFRQ signal, the beam failure CC, of multiple CCs established with the UE, on which the beam failed. As described, for example, BFRQ detecting component 352 can determine the CC(s) that experienced beam failure based on an indication of an index of the CC (or group of CCs) in the BFRQ signal, based on receiving the BFRQ signal on a CC set as a reference CC for a group of CCs, based on the resource selected for the BFRQ signal (e.g., the resource blocks, tones, symbols, slots, etc.), etc. In addition, for example, BFRQ detecting component 352 can determine one or more parameters for generating a recovery beam, such as the CC on which beam failure was experienced, as described, one or more beam strength parameters for selecting a recovery beam, and/or the like, which may also be based on one or more explicit or implicit parameters of the BFRQ signal.

In method 600, at Block 606, a recovery beam for the beam failure CC can be transmitted. In an aspect, beam transmitting component 354, e.g., in conjunction with processor(s) 312, memory 316, transceiver 302, communicating component 146, etc., can transmit the recovery beam for the beam failure CC. For example, beam transmitting component 354 can transmit the recovery beam, or related recovery information, over the CC over which the BFRQ request is received (e.g., over beam resources and/or downlink control resources, e.g., PDCCH, where the BFRQ signal is received over the PUCCH resources, etc.). In another example, the beam transmitting component 354 can transmit the recovery beam over the CC experiencing beam failure. In one example, beam transmitting component 354 can transmit the recovery beam based on the one or more beam strength parameters, such as by selecting a beam that can achieve the beam strength parameters, and transmitting that beam over a CC. In one example, beam transmitting component 354 can transmit a beam failure CORESET beam (or beams) to be monitored to re-establish link based on signal strengths indicated as part of the direct beam failure indication on the other CC.

Figure 7:
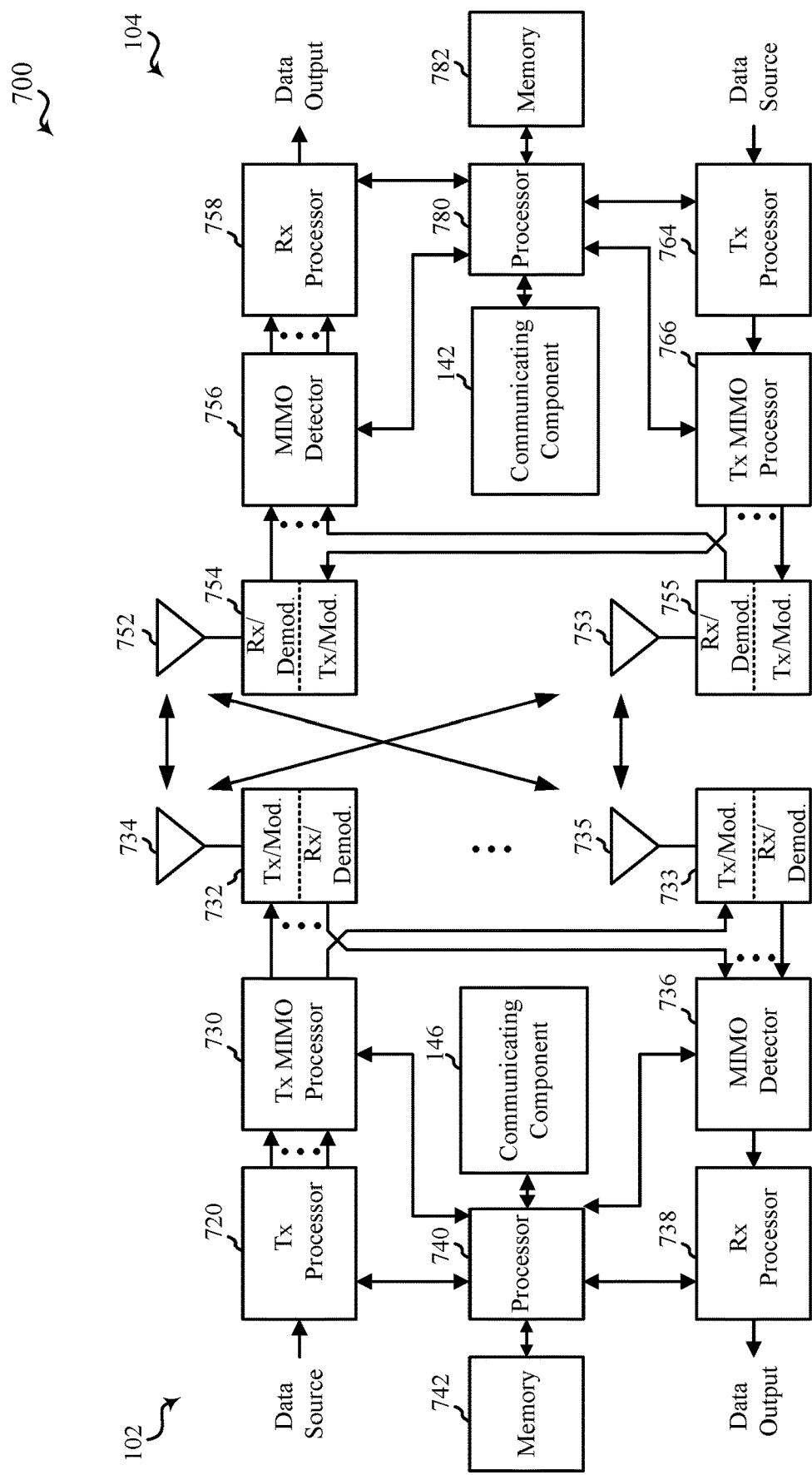
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 142 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a communicating component 146 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
   configuring, at a user equipment (UE), a virtual control channel resource that is not used for control channel transmissions;

deriving, from the virtual control channel resource, default beam information for a beam for data channel communications;

using the default beam information for configuring the beam for a data channel communication where explicit beam information is not configured or indicated for the data channel communication; and transmitting the data channel communication based on the beam configured using the default beam information.

2. The method of claim 1, wherein configuring the virtual control channel resource includes semistatically configuring the virtual control channel resource based on receiving a semistatic configuration from a network node.

3. The method of claim 2, wherein semistatically configuring the virtual control channel resource comprises configuring spatial information for the virtual control channel resource without transmitting over the virtual control channel resource.

4. The method of claim 2, wherein semistatically configuring the virtual control channel resource comprises excluding the virtual control channel resource from all configured control channel resource sets.

5. The method of claim 2, wherein using the default beam information is based at least in part on determining a duration corresponding to the virtual control channel resource.

6. The method of claim 1, wherein deriving the default beam information from the virtual control channel resource is based on expiration of a beam associated with a control channel resource.

7. The method of claim 1, wherein deriving the default beam information from the virtual control channel resource is based on expiration of a beam indicated in a radio resource control (RRC) configuration message, media access control (MAC) layer control element (CE), or downlink control information (DCI) received from an access point.

8. The method of claim 1, wherein using the default beam information relates to transmitting the data channel communication over a first CC, and wherein the default beam information relates to one or more other CCs.

9. An apparatus for wireless communication, comprising:
a transceiver;
a memory configured to store instructions; and
one or more processors communicatively coupled with the transceiver and the memory, wherein the one or more processors are configured to:
configure a virtual control channel resource that is not used for control channel transmissions;
derive, from the virtual control channel resource, default beam information for a beam for data channel communications;
use the default beam information for configuring the beam for a data channel communication where explicit beam information is not configured or indicated for the data channel communication; and
transmit the data channel communication based on the beam configured using the default beam information.

10. The apparatus of claim 9, wherein the one or more processors are configured to configure the virtual control channel resource at least in part by semistatically configuring the virtual control channel resource based on receiving a semistatic configuration from a network node.

11. The apparatus of claim 10, wherein the one or more processors are configured to semistatically configure the virtual control channel resource at least in part by configuring spatial information for the virtual control channel resource without transmitting over the virtual control channel resource.

12. The apparatus of claim 10, wherein the one or more processors are configured to semistatically configure the virtual control channel resource at least in part by excluding the virtual control channel resource from all configured control channel resource sets.

13. The apparatus of claim 10, wherein the one or more processors are configured to determine to use the default beam information based at least in part on determining a duration corresponding to the virtual control channel resource.

14. The apparatus of claim 9, wherein the one or more processors are configured to derive the default beam information from the virtual control channel resource based on expiration of a beam associated with a control channel resource.

15. The apparatus of claim 9, wherein the one or more processors are configured to derive the default beam information from the virtual control channel resource based on expiration of a beam indicated in a radio resource control (RRC) configuration message, media access control (MAC) layer control element (CE), or downlink control information (DCI) received from an access point.

16. The apparatus of claim 9, wherein the one or more processors are configured to use the default beam information for transmitting the data channel communication over a first CC, and wherein the default beam information as relates to one or more other CCs.

17. An apparatus for wireless communication, comprising:
means for configuring a virtual control channel resource that is not used for control channel transmissions;
means for deriving, from the virtual control channel resource, default beam information for a beam for data channel communications;
means for using the default beam information for configuring the beam for a data channel communication where explicit beam information is not configured or indicated for the data channel communication; and
means for transmitting the data channel communication based on the beam configured using the default beam information.

18. The apparatus of claim 17, wherein the means for configuring configures the virtual control channel resource at least in part by semistatically configuring the virtual control channel resource based on receiving a semistatic configuration from a network node.

19. The apparatus of claim 18, wherein the means for configuring semistatically configures the virtual control channel resource at least in part by configuring spatial information for the virtual control channel resource without transmitting over the virtual control channel resource.

20. The apparatus of claim 18, wherein the means for configuring semistatically configures the virtual control channel resource at least in part by excluding the virtual control channel resource from all configured control channel resource sets.

21. The apparatus of claim 18, wherein the means for using the default beam information uses the default beam information based at least in part on determining a duration corresponding to the virtual control channel resource.

22. The apparatus of claim 17, wherein the means for deriving derives the default beam information from the virtual control channel resource based on expiration of a beam associated with a control channel resource.

23. The apparatus of claim 17, wherein the means for deriving derives the default beam information from the virtual control channel resource based on expiration of a beam indicated in a radio resource control (RRC) configuration message, media access control (MAC) layer control element (CE), or downlink control information (DCI) received from an access point.

24. A non-transitory computer-readable medium, comprising code executable by one or more processors for wireless communications, the code comprising code for:
configuring a virtual control channel resource that is not used for control channel transmissions;
deriving, from the virtual control channel resource, default beam information for a beam for data channel communications;
using the default beam information for configuring the beam for a data channel communication where explicit beam information is not configured or indicated for the data channel communication; and
transmitting the data channel communication based on the beam configured using the default beam information.

25. The non-transitory computer-readable medium of claim 24, wherein the code for configuring configures the virtual control channel resource at least in part by semistatically configuring the virtual control channel resource based on receiving a semistatic configuration from a network node.

26. The non-transitory computer-readable medium of claim 25, wherein the code for configuring semistatically configures the virtual control channel resource at least in part by configuring spatial information for the virtual control channel resource without transmitting over the virtual control channel resource.

27. The non-transitory computer-readable medium of claim 25, wherein the code for configuring semistatically configures the virtual control channel resource at least in part by excluding the virtual control channel resource from all configured control channel resource sets.

28. The non-transitory computer-readable medium of claim 25, wherein the code for using the default beam information uses the default beam information based at least in part on determining a duration corresponding to the virtual control channel resource.

29. The non-transitory computer-readable medium of claim 24, wherein the code for deriving derives the default beam information from the virtual control channel resource based on expiration of a beam associated with a control channel resource.

30. The non-transitory computer-readable medium of claim 24, wherein the code for deriving derives the default beam information from the virtual control channel resource based on expiration of a beam indicated in a radio resource control (RRC) configuration message, media access control (MAC) layer control element (CE), or downlink control information (DCI) received from an access point.

* * * * *